United States Patent [19]

Chow

[11] 4,082,903
[45] Apr. 4, 1978

[54] TREE FOLIAGE EXTENDERS AND FILLERS FOR WOOD ADHESIVES

[75] Inventor: Suezone Chow, Vancouver, Canada

[73] Assignee: Canadian Patents and Development Limited, Ottawa, Canada

[21] Appl. No.: 771,992

[22] Filed: Feb. 25, 1977

[30] Foreign Application Priority Data

Feb. 27, 1976 Canada .................................... 246732

[51] Int. Cl.² ............................................... C08L 1/02
[52] U.S. Cl. ..................................... 428/514; 260/17.2; 260/17.3; 260/17.4 R; 428/528; 428/529
[58] Field of Search ................ 260/17.2, 17.3, 17.4 R; 428/528, 529, 514

[56] References Cited

U.S. PATENT DOCUMENTS

| | | |
|---|---|---|
| 2,180,547 | 11/1939 | Peterson ............................. 260/17.2 |
| 3,429,770 | 2/1969 | Ayers ................................. 260/17.2 |
| 3,696,064 | 10/1972 | Re ..................................... 260/17.2 |

*Primary Examiner*—Edward M. Woodberry
*Attorney, Agent, or Firm*—Alan A. Thomson

[57] ABSTRACT

An extender (and filler) for wood adhesives is provided from tree foliage powder or mulch. Suitable tree foliage includes that of conifers and other evergreens, and of deciduous trees. Test results have shown equivalent or better performance for the foliage powder compared to the normally used wheat flour, in bonding plywood or particleboard.

14 Claims, No Drawings

TREE FOLIAGE EXTENDERS AND FILLERS FOR WOOD ADHESIVES

FIELD OF THE INVENTION

This invention deals with adhesive formulations in which the extender or extender plus filler is dried ground foliage or foliage mulch. Conventional adhesive extenders such as wheat flour, and conventional fillers such as nut shell flour, bark flour or corn cob flour can be replaced by foliage powder, most suitably from conifers and deciduous trees. Adhesive properties such as viscosity, assembly time, curing behaviour, bond strength, moisture resistance, etc. are at least equivalent and in some cases improved compared to the conventional extenders and fillers.

The adhesive base is preferably phenolic, amine- or amide-aldehyde or equivalent curable resin glue. Of particular interest are the plywood, laminate, and particleboard adhesives.

DESCRIPTION OF THE PRIOR ART

Adhesive formulations are frequently based on room and high temperature curing synthetic resins such as phenol-formaldehyde, phenol-resorcinol-formaldehyde, urea-formaldehyde, urea-melamine-formaldehyde, and polyvinyl acetate glues. These resins are extended with additives which can have some adhesive properties in addition to the capability of controlling viscosity or other rheological properties of the formulation. In some cases, the extender can have the function of conserving water in the adhesive to avoid drying out during the period of assembly before pressing, and thus can prolong the assembly time tolerance of the adhesive (this is important to the quality of the adhesive bonds in the final products). In addition to the extender, a filler is normally incorporated in such formulations primarily to increase the bulk of the adhesive without unduly interfering with its curing and adhesion properties.

In the wood bonding industry, the conventional adhesive extender used is wheat flour. Wheat flour prices have tripled in recent years and supply is getting difficult. Fillers used are usually the powder of corn cobs, tree barks or walnut shells. Their supply is inconsistent and their prices have also increased greatly. The search for a substitute extender and filler material becomes one of the most important tasks to the plywood and laminating industry. The use of mineral powder or clay has been tried. The drawbacks to the use of the mineral powder or clay are they they will result in abrasiveness in the glueline causing wear of cutting tools, and the mineral and clay filled adhesives tend to creep more than normal adhesives when wet (as shown by our own research). Other alternatives that have been investigated adversely affect the physical properties or durability of the glue bond.

SUMMARY OF THE INVENTION

It has now been found that ground tree foliage is a very satisfactory and economical extender or combined extender-filler in wood adhesive compositions. The foliage can be dried and ground to a powder, or can be wet ground to a mulch. The starting foliage need not be dried out or "dead" but can be in green condition. The foliage can be obtained from conifers and other evergreens, or from deciduous trees. Suitable evergreens include pine, spruce, fir, hemlock, cedar and redwood; while suitable deciduous trees include poplar, birch, maple, elm and basswood. The ground foliage has been found to be an active extender, i.e. it is not just a diluent or filler, but contributes some adhesive or bonding capacity to the composition under adhesive curing conditions.

For wood bonding the usual adhesive types are phenolic resins and amine- or amide-aldehyde resins. Particular resin glues in widespread use are phenol-formaldehyde condensation products (novolacs) and urea-formaldehyde condensation products (intermediate-stage). Other suitable resin glues include polyvinyl acetate, urea-melamine-formaldehyde and phenol-resorcinol-formaldehyde glues. The polyvinyl acetate resin glues are usually in aqueous emulsion form. The foliage powder is very suitable for use in dry powder adhesives as illustrated in Example 8.

The foliage powder is mixed into the adhesive similarly to other extenders and fillers. Any technique that gives uniform mixtures for spreading before curing is suitable. The amounts of foliage incorporated can vary widely depending on the type of adhesive and bond strengths required. For plywood adhesives from about 1 to about 65% by weight of the total solids in the composition would be acceptable with the preferred range being about 2 to about 15% foliage. For lower strength adhesives such as waferboard and particleboard type, the amount of foliage can range up to about 95% by weight of the composition solids. The strength will generally decrease with increasing amounts of foliage but even at levels of 80 to 95% foliage, bond strengths of the order of 60 to 70 psi can be achieved (such strengths are acceptable for certain uses, for example, interior-use particleboard or furniture panels).

The particle size of the foliage powder may range from $-325$ mesh up to about $-40$ mesh, or diameters up to about 0.4 mm or more. The particle size is not critical but should be fine enough to permit uniform adhesive mixtures to be formed.

DESCRIPTION OF PREFERRED EMBODIMENTS

The following Experimental Results are illustrative.

FOLIAGE MATERIAL PREPARATION

For these tests, the foliage samples were prepared in two ways; one by using dry foliage powder and the other by using foliage mulch. The dry foliage powder can be prepare by air-drying or drying of foliage (or foliage which has been solvent extracted) by heat to a moisture content that will permit easier grinding of the foliage mass (which may be adulterated with some branch materials). For example, after drying of Douglas-fir foliage in an oven at 100° C to a moisture content below 10%, the foliage becomes very easy to pulverize by simple Wiley mill grinding. In an experiment in which the dry foliage was ground to pass a 50 mesh screen, the size distribution was as follows:

equal or greater than 60 mesh: 3.5%
retain on 100 mesh: 36.4%
retain on 120 mesh: 10.7%
retain on 200 mesh: 34.7%
smaller than 200 mesh: 14.6%

Even without a fine separation, the total mass was found easy to mix in adhesives for plywood gluing. In all experiments described hereafter the foliage (except for mulch) was dried at 100° C to a moisture content below 5% and then ground to pass a 50 mesh screen.

The total mass as ground was directly used in experiments without further screening.

The foliage mulch was prepared by grinding green foliage (which had never been dried) in a mechanical blender. Depending on the moisture content of the green foliage, preferably a selected amount of water was added (e.g. for a moisture content of foliage of about 100 to 150% of dry solids, water additions of about 40 to 50% weight of green foliage were adequate) to facilitate the grinding. The moisture content of the mulch was later measured by the oven-dry weight method for calculation of solids requirements in the glue mixture.

Acidity of Foliage

Since wood adhesives can be roughly separated into two large groups: acid curing (urea-type) and alkaline curing (phenol-formaldehyde), the pH of foliage would be important to the viscosity and curing of the adhesives.

To examine the acidity of the foliage, 250 grams dry powder foliage in 800 ml of water was thoroughly stirred for about 20 minutes and the pH was then taken using a pH meter. A 5 ml portion of 15% NaOH in water solution was added to the mixture and stirred for about 10 minutes and the pH was taken again. In the same manner, the pH of the foliage solution was measured after each addition of the 5 ml NaOH solution.

Douglas-fir, western hemlock and western red cedar foliage pH were measured and their results are shown in Table 1. The quantity of NaOH addition to the foliage is expressed as percent solid foliage weight.

The results indicate that the pH of the three foliage species without the addition of sodium hydroxide solution is in the range of 3.8 to 5.3. The pH values of the scotch pine (pinus sylvestris), Schefflera (hardwood), and red alder (hardwood) foliage powders tested in the same manner were found to be 4.7, 5.7 and 5.3 respectively. The pH values can be easily brought to neutral value, pH 6–7, with a small amount of sodium hydroxide addition, about

TABLE 1

| | pH of foliage samples | | |
|---|---|---|---|
| NaOH addition (%) | Douglas-fir | W. hemlock | W.R. cedar |
| 0 | 3.8 | 4.0 | 5.3 |
| 0.3 | 4.3 | 4.3 | 7.4 |
| 0.6 | 4.7 | 4.6 | 7.9 |
| 0.9 | 5.4 | 5.0 | 8.4 |
| 1.2 | 6.5 | 5.6 | 8.7 |
| 1.5 | 7.4 | 6.6 | 8.9 |
| 1.8 | 7.9 | 7.8 | 9.2 |
| 2.1 | 8.3 | 8.4 | 9.4 |
| 2.4 | 8.5 | 8.8 | 9.6 |
| 2.7 | 8.8 | 9.0 | 9.8 |
| 3.0 | 9.0 | 9.3 | 10.0 |

0.3 to 1.5% solid weight as shown in Table 1. The neutralization is especially important to the acid catalyzed adhesives such as urea-formaldehyde and urea-melamine types since the acid in foliage will serve as a catalyst to accelerate the cure hence shorten the pot life of the glue mix. In the alkaline catalyzed system such as phenol-formaldehyde glue, the already high sodium hydroxide content in the adhesives should be able to buffer the acidity and reduce the influence.

The pH of foliage can also be changed by solvent extraction to remove the soluble acidic substances. For example, after a petroleum ether extraction of the cedar, Douglas-fir and hemlock foliage powder, the pH of the extracted foliage mass in water solution was 5.6, 4.2 and 4.5 respectively.

Thermal Property of Foliage

To understand the thermal properties of foliage in relation to the curing of phenolic resin, differential scanning calorimetric analyses of foliages and adhesives were performed. All foliages basically behaved similarly with the appearance of an endothermic peak for the temperature below 100° C, which is caused by the residual moisture content in the foliage (about 1.5%) and the melting phenomena of the foliage substances. After than two exothermic reactions at 120° C and 160° C appeared. The position of the peaks do not appear to change for softwood species (Douglas-fir, western hemlock, western red cedar, white spruce, lodgepole pine). However, the relative intensity of the exothermic peaks tended to vary with species of foliage. The approximate average exothermic energy outputs for all foliage species in the 120° C and 160° C regions are respectively 69 and 48 cal per gram of foliage.

The thermogram of a powdered phenolic resin used in the waferboard industry showed an endothermic peak (melting) below the 100° C, which also appeared in the foliage thermogram. The resin thermogram also showed a sharp, strong exothermic peak at 160° C for the resin at phenol to formaldehyde ratios from 1:0.8 to 1:1.2. The exothermic energy for the 160° C peak is about 118 cal per gram of resin. When the resin is mixed with white spruce foliage in a 50/50 mixture, the thermogram showed preservation of the exothermic peaks in the 120° C and 160° C region with their exothermic energies tending to be additive. Based on additional work done on the thermal softening properties, it is reasonable to suggest that with the use of foliage in the adhesive mixture, the foliage could give auxiliary heat for adhesive curing. The foliage thus can synergistically function as both a catalyst and adhesive. As will be shown in a later example, this feature of the foliage does exist in the making of waferboard.

Viscosity of foliage and adhesive mixtures

A commercial phenol-formaldehyde plywood resin was used for the experiment. Glue formation and mixing procedures were as follows:

| | | |
|---|---|---|
| Phenol-Formaldehyde resin | 248.3 g | |
| water | 145.3 g | |
| Model filler | 70.0 g | (commercial Alder bark filler) |
| Mix for 2 minutes | | |
| Wheat flour | 15.0 g | |
| Soda ash | 13.0 g | |
| Mix for 20 minutes | | |
| Phenol-Formaldehyde resin | 189.7 g | |
| Total | 681.3 g | |

This formula of glue was used as a control for comparison with glues in which the wheat flour (extender) and Model filler were substituted by foliage powder.

In the commercial Phenol-Formaldehyde resin formulation, the addition of Model filler and wheat flour (to a total of 681.3 grams glue) were 70 grams (10.3%) and 15 grams (2.2% based on total glue weight) respectively. To scale down these figures by a factor of 10, the experimental data for 0 gram foliage addition represents the control commercial formulation. The 1.5 grams foliage addition indicates the complete replacement of wheat flour while the Model filler remains unchanged.

An increased amount of foliage addition (greater than 1.5 grams) indicates that the glue contains no wheat flour and the Model filler portion has been reduced by the amount of excess foliage over 1.5 grams. Thus at an addition of 8.5 grams (12.5% of glue weight) foliage, the glue mix contains no other filler or extender.

Table 2 shows the results of the effect of w. hemlock and w.r. cedar foliage addition to the glue viscosity. The viscosity was taken with a Brookfield viscosimeter at 25° C with LVF-SC4-34/13 spindle at a 30 rpm spindle speed.

TABLE 2

| Foliage addition | | Viscosity (cps) | |
|---|---|---|---|
| (grams) | (%)* | W. hemlock | W.R. cedar |
| 0 | 0 | 920 | 920 |
| 1.5 | 2.2 | 740 | 1100 |
| 2.5 | 3.7 | 820 | 1170 |
| 3.5 | 5.1 | 720 | 1160 |
| 4.5 | 6.6 | 610 | 910 |
| 5.5 | 8.1 | 540 | 900 |
| 6.5 | 9.5 | 580 | 860 |
| 7.5 | 11.0 | 600 | 860 |
| 8.5 | 12.5 | 550 | 930 |

*percentage of glue weight

The addition of w. hemlock foliage up to 4.5 grams (6.6% of glue weight) tended to decrease viscosity and with higher additions a relatively constant viscosity was maintained at about the 550 to 580 cps range. The cedar foliage addition increased viscosity about 200 to 300 cps, in comparison to control, for additions of up to 3.5 grams of foliage. When additions of the cedar foliage were greater than 4.5 grams, the viscosity was essentially the same as the control.

The viscosity of glues with the addition of other tree species of foliages are shown in Table 2a.

The Table 2a viscosity data indicate that, except for hemlock which tended to decrease in viscosity as the foliage concentration increased, the viscosity of a coniferous phenol-formaldehyde glue mix is relatively constant and comparable to the viscosity of commercial phenol-formaldehyde glue. The viscosity of red alder is high and requires some adjustment of viscosity for easy glue spread. Since the viscosity of glues depend on the species of foliage added, this suggests that depending on the industrial application, either single or mixed species of foliage can be used for different purposes.

TABLE 2a

| Foliage addition | | Viscosity (cps)* | | |
|---|---|---|---|---|
| (grams) | (%)*** | Douglas fir | Pine** | Red alder |
| 0 | 0 | 920 | 920 | 920 |
| 2.5 | 3.7 | 850 | 1020 | 1500 |
| 5.5 | 8.1 | 910 | 1080 | 4800 |
| 8.5 | 12.5 | 1200 | 1150 | 6400* |

*determined using LFV-SC4-25/13 spindle
**pinus spp.
***percentage of glue weight To examine the influence of the mixed in foliage species on the physical properties of the adhesive mixture, a 50/50 mixture of white spruce and lodgepole pine foliage powders were made and added to a plywood phenol-formaldehyde resin. The Model (bark) filler, wheat flour (extender) and soda ash were completely eliminated from the glue formulations. The glue formulations were made in such a way that the solid content of the glue ranged from 41.6 to 45.6%, while the foliage/resin solid ratio ranged from 55.4% to 65.2%. After the glue was mixed, the viscosity of the glue was taken by a Brookfield viscosimeter and the specific gravity (S.G.) of the glue was measured based on the weight-volume relationship. The results of the experiment are shown in Table 2b.

TABLE 2b

| Adhesives | Solid Content (%) | Foliage/resin solid ratio (%) | Specific Gravity | Viscosity (cps) |
|---|---|---|---|---|
| Resin alone | 42 | — | 1.21 | 666 |
| Control (Model) | 42.7 | — | 1.19 | 1694 |
| Foliage add. | 41.6 | 55.4 | 1.14 | 732 |
| Foliage add. | 42.9 | 65.2 | 1.11 | 1424 |
| Foliage add. | 43.2 | 55.4 | 1.16 | 1161 |
| Foliage add. | 44.5 | 65.2 | 1.06 | 2400 |
| Foliage add. | 44.6 | 55.4 | 1.14 | 1906 |
| Foliage add. | 45.9 | 65.2 | 1.07 | 5560 |

The foliage mixture tended to give viscosities equal to the conventional control glue with Model and wheat flour extender, at the approximate solids content of 44.6% which is about 2% greater than the control glue. The specific gravity of the glue was found to decrease with an increase in foliage content. For example, the conventional plywood glue (control) specific gravity was 1.19; with the same solids content the foliage glue S.G. was about 1.11. When the solids content of the foliage-mixed glue approached 45%, the specific gravity of the glue was about 1.06.

The above data indicate that more of the foliage additive can be put in the phenolic resin while maintaining a similar viscosity to that of the control glue. Since the foliage glue has a lower specific gravity than the control glue, with the same glue spread, the foliage glue will give more volume of glue per unit area than the control glue. Thus the foliage mixed adhesive should have a greater gap filling potential.

Determination of the effect of foliage addition on the curing of adhesives

It is known that carbohydrates hinder the curing of some adhesives, especially phenol-formaldehyde resin. The extent of the curing hindrance will depend on the quantity of the carbohydrate present in the adhesive.

An ultraviolet spectrophotometric method (Chow, S. and W. V. Hancock, Forest Prod. J. 19(4): 21–29, 1969) was used to determine the degree of cure of phenol-formaldehyde resin. The formulation of the commercial adhesive as shown above was used as control. Three levels of foliage powder addition (2.5, 5.5 and 8.5 grams) to the adhesives with species of W. red cedar, W. hemlock, red alder, Douglas-fir and pine were used. These adhesive-foliage mixtures were also used in the above viscosity determination.

A 10 gram weight of adhesive foliage mixture was spread as a thin film on a glass plate and then heated in an oven at 120° C for 20 to 40 minutes. When the designated heating time was reached approximately 100 mg of the sample was removed from the oven and placed in a beaker with 50 ml of water under constant stirring. Ten minutes later, the U.V. absorption spectrum of the water solution was taken and the degree of cure of the adhesive calculated.

The results are shown in Table 3.

TABLE 3

| Foliage species | Foliage Addition to adhesive | | Degree of cure (%) Curing Time (min) | |
|---|---|---|---|---|
| | (g) | (%)* | 20 | 40 |
| Control | 0 | 0 | 50 | 82 |
| Douglas- | 2.5 | 3.7 | 50 | 86 |

TABLE 3-continued

| Foliage species | Foliage Addition to adhesive (g) | (%)* | Degree of cure (%) Curing Time (min) 20 | 40 |
|---|---|---|---|---|
| fir | | | | |
| | 5.5 | 8.1 | 50 | 82 |
| | 8.5 | 12.5 | 48 | 82 |
| Pine | 2.5 | 3.7 | 53 | 82 |
| | 5.5 | 8.1 | 51 | 86 |
| | 8.5 | 12.5 | 50 | 82 |
| Hemlock | 2.5 | 3.7 | 58 | 82 |
| | 5.5 | 8.1 | 53 | 86 |
| | 8.5 | 12.5 | 50 | 80 |
| W.R. Cedar | 2.5 | 3.7 | 64 | 82 |
| | 5.5 | 8.1 | 64 | 80 |
| | 8.5 | 12.5 | 46 | 80 |
| Red alder | 2.5 | 3.7 | 50 | 82 |
| | 5.5 | 8.1 | 50 | 85 |
| | 8.5 | 12.5 | 46 | 80 |

*percentage of glue weight

TABLE 4

Douglas-fir foliage-adhesive

| Pressing time (min) | Control psi | WF | 1.5 add.* psi | WF | 5.5 add.* psi | WF | 8.5 add.* psi | WF |
|---|---|---|---|---|---|---|---|---|
| 4 | 139 | 65 | 150 | 66 | 174 | 54 | 145 | 34 |
| 5 | 175 | 83 | 160 | 85 | 190 | 86 | 191 | 52 |
| 6 | 167 | 88 | 166 | 93 | 193 | 83 | 191 | 91 |
| 7 | 194 | 97 | 161 | 96 | 188 | 89 | 212 | 90 |

W.R. Cedar foliage adhesive

| | | | | | | | | |
|---|---|---|---|---|---|---|---|---|
| 4 | 166 | 68 | 178 | 74 | 215 | 72 | | |
| 5 | 196 | 90 | 166 | 88 | 222 | 80 | | |
| 6 | 189 | 89 | 204 | 82 | 219 | 82 | | |
| 7 | 220 | 92 | 214 | 88 | 212 | 94 | | |

*gram weight of foliage powder addition to the Standard adhesive formulation above. The 1.5, 5.5 and 8.5 gram foliage additions are equivalent to the 2.2, 8.1 and 12.5% of glue weight respectively.

Another experiment using white spruce and lodgepole pine foliage as extender and filler with phenol-formaldehyde glue gave results shown in Table 4a.

TABLE 4a

| Pressing time (min) | Open Assem. time (min) | Control PSI | WF (%) | 3.8 add. PSI | WF (%) | 6.2 add. PSI | WF (%) | 8.5 add.* PSI | WF (%) |
|---|---|---|---|---|---|---|---|---|---|
| 4 | 15 | 199 | 71 | 201 | 88 | 197 | 76 | 174 | 80 |
| 4 | 25 | 166 | 81 | 236 | 91 | 186 | 92 | 185 | 84 |
| 6 | 15 | 188 | 96 | 178 | 89 | 199 | 94 | 197 | 92 |
| 6 | 25 | 183 | 94 | 206 | 86 | 188 | 92 | 191 | 85 |

*gram weight of foliage powder addition to the standard adhesive formulation.

The experimental results indicate that the curing rate of the control adhesive and the adhesives with different concentrations of foliage contents are essentially the same. In the case of W.R. cedar, the curing speed of foliage adhesive in the 20 minute curing tended to be faster than the control when the foliage addition was in the 2.5 to 5.5 grams weight range. The curing results suggest that the interference of the carbohydrate in foliage on the degree of cure of adhesive is not severe and does not reduce the value of the foliage as extender and filler. This curing property of adhesive will be further confirmed in the plywood panel tests.

EXAMPLE 1

Adhesive curing in plywood panels

To confirm the curing data from the ultraviolet spectrometric method as described above, plywood panel testing was done with Douglas-fir and W.R. cedar foliage addition to the phenol-formaldehyde adhesive. With Douglas-fir foliage powder, 1.5, 5.5 and 8.5 gram weight of foliage additions were made to the adhesive as described above. In the case of W.R. cedar, only 1.5 and 5.5 gram foliage additions were done.

Five-ply plywoods were made with ⅛ in. thick white spruce veneers, with 55 pound per thousand square feet glue spread in double glueline. The open assembly time was 15 minutes, the pressing temperature was 300° F and pressing pressure was 175 psi. The pressing times were 4, 5, 6 and 7 minutes. For each pressing time, 2 panels were made.

The resulting panels were cut into standard shear specimens which were then subjected to vacuum-pressure soak treatment. The shear strength of plywood specimens was measured for lathe check pull-close while the specimens were still wet. The results are shown in Table 4. The "psi" values are the stress values at failure, and the "WF" values are the % of wood failure (failure in the wood rather than in the bond).

From the bond quality, especially wood failure values of the plywood panels, it is clear that there is practically no curing difference between the control adhesive and foliage adhesives, as also demonstrated by the ultraviolet spectrometry method results shown above.

EXAMPLE 2

The effect of foliage addition on the assembly time of plywood.

Extended assembly time of the adhesive is vital to the adhesion strength of the composite products. It intimately relates to the capability of the adhesive to conserve its moisture prior to panel pressing so as to avoid the dry-out phenomena.

To test assembly time tolerance of the foliage-added-adhesives in comparison to that of the control commercial adhesive, the foliage powders of Douglas-fir, hemlock and cedar were used in this Example. The adhesives were formulated with 1.5 and 5.5 grams foliage additions to the standard phenol-formaldehyde resin formulation. The glue was spread in 55 pounds per thousand square foot double gluelines. The assembly times were 10 to 80 minutes at 10 minute intervals. All the panels were pressed at 300° F with 6 minutes pressing time and under 175 psi pressure. Two replicate panels were made for each assembly time.

After the panels were made, the plywoods were cut into shear specimens and subjected to boil-dry-boil cyclic treatment. The specimens were then tested while wet. Ten shear specimens were tested from each panel.

The results of the assembly time experiment are shown in Table 5.

TABLE 5

| Assembly time (min) | Control psi | WF(%) | 1.5 add.* psi | WF(%) | 5.5 add.* psi | WF(%) |
|---|---|---|---|---|---|---|
| Douglas-fir foliage-adhesive | | | | | | |

TABLE 5-continued

| | | | | | | |
|---|---|---|---|---|---|---|
| 10 | 217 | 90 | 224 | 77 | 206 | 77 |
| 20 | 188 | 54 | 198 | 82 | 203 | 72 |
| 30 | 201 | 78 | 195 | 90 | 194 | 84 |
| 40 | 201 | 82 | 198 | 85 | 223 | 86 |
| 50 | 208 | 91 | 203 | 83 | 204 | 90 |
| 60 | 206 | 85 | 219 | 90 | 176 | 84 |
| 70 | 170 | 83 | 200 | 80 | 206 | 93 |
| 80 | 239 | 79 | 189 | 83 | 191 | 88 |
| W.R. Cedar foliage-adhesive | | | | | | |
| 10 | 221 | 92 | 231 | 93 | 173 | 85 |
| 20 | 178 | 90 | 210 | 89 | 235 | 93 |
| 30 | 233 | 88 | 230 | 91 | 186 | 95 |
| 50 | 164 | 93 | 166 | 94 | 182 | 97 |
| 70 | 168 | 92 | 172 | 93 | 185 | 97 |
| W. Hemlock foliage-adhesive | | | | | | |
| 10 | 217 | 93 | 199 | 75 | 175 | 76 |
| 20 | 188 | 54 | 208 | 89 | 213 | 58 |
| 30 | 201 | 78 | 185 | 95 | 183 | 84 |
| 40 | 201 | 82 | 208 | 81 | 167 | 76 |
| 50 | 208 | 91 | 200 | 82 | 220 | 83 |
| 60 | 206 | 85 | 199 | 91 | 191 | 90 |
| 70 | 170 | 83 | 173 | 87 | 182 | 85 |
| 80 | 239 | 79 | 207 | 92 | 176 | 87 |

*gram weight foliage addition to the adhesive standard formulation: psi = shear strength; WF(%) = percent wood failure. The 1.5 and 5.5 gram weight additions are equivalent to the 2.2 and 8.1% glue weight respectively.

From Table 5, the use of foliage in the adhesive formulation gave practically the same assembly time tolerance as the control. In some cases, the foliage addition indicated that the assembly time tolerance can be prolonged.

EXAMPLE 3

Assembly time experiment with veneers of high absorbent nature

Example 2 used white spruce veneers which were relatively not as water absorbent as other experimental materials. In this Example, a group of white spruce veneers which had proven in mill production to be highly absorbent and gave relatively short assembly time tolerance in the plywood assembly were used. The cedar foliage adhesive with complete substitution of filler and extender was used. The open assembly times were 40, 60, 80 and 100 minutes. The pressing condition and testing procedure was the same as Example 2.

The results are shown in the following Table 6.

TABLE 6

| | Assembly Time (min.) | | | | | | | |
|---|---|---|---|---|---|---|---|---|
| | 40 | | 60 | | 80 | | 100 | |
| Glue | psi | WF% | psi | WF% | psi | WF% | psi | WF% |
| Control | 146 | 69 | 35 | 13 | 0 | 0 | 0 | 0 |
| Cedar W.R. | | | | | | | | |
| W.R. (powder) | 145 | 68 | 117 | 90 | 134 | 40 | 116 | 36 |

This experiment indicates that the complete substitution of commercial filler and extender with dry foliage powder can prolong the assembly time of the adhesive and increase the bond quality.

EXAMPLE 4

Use of foliage mulch

Instead of foliage powder, foliage mulch was used in this Example. Since the foliage mulch contains water, to obtain the equivalent solid weight of foliage content for the substituted wheat flour, one glue was prepared by use of 40.3 grams water and 120 grams of ceder mulch (m.c. 129%). The other glue had 58.9 grams water and 101.4 grams hemlock mulch (m.c. 147%). The rest of the glue ingredients were the same as the above commercial control formulation.

The above three glues: cedar, hemlock and control were used for comparison of their bonding ability. The pressing temperature was 300° F and a pressing time of 5 minutes was used in all cases. Only 3-ply plywoods were made. At each assembly time two panels were made. The open assembly times were 10, 20, 30, 40, 60 and 80 minutes. The veneers used came from the same source as Example 3. After the plywood was made, shear specimens used were subjected to boil-dry-boil treatment. The testing results are shown in Table 7.

TABLE 7

| | Assembly Time (min.) | | | | | | | | | | | |
|---|---|---|---|---|---|---|---|---|---|---|---|---|
| | 10 | | 20 | | 30 | | 40 | | 60 | | 80 | |
| Glue | psi | WF% | psi | WF% | psi | WF% | psi | WF% | psi | WF% | psi | WF% |
| Control | 195 | 72 | 165 | 94 | — | — | 156 | 66 | 169 | 59 | 121 | 15 |
| Hemlock (mulch) | 197 | 87 | 208 | 85 | 189 | 88 | 218 | 87 | 195 | 88 | 130 | 25 |
| Cedar W.R. (mulch) | 198 | 84 | 144 | 92 | 132 | 92 | 167 | 77 | 117 | 29 | 117 | 21 |

This result indicates that foliage mulch can successfully replace the wheat flour extender with a bonding result better or equal to the control glue while the assembly time tolerance is prolonged.

EXAMPLE 5

Extended open-assembly time

In order to test if the foliage glue can tolerate an extreme mill open-assembly time, the glues with hemlock mulch (Example 4) and the glue with cedar foliage powder (Example 3) were used.

The hemlock glue after spreading on veneer was allowed to have 30 minutes open-assembly time, then placed in between the press platens (300° F) for 1 minute before closure of the platens. The plywood with cedar glue was allowed to have open-assembly time of 20 and 40 minutes and then placed in between the two hot platens for 1 minute before press closure.

The results indicate that the hemlock glue gave bond quality of 130 psi strength and 90% wood failure for an open-assembly time of 30 minutes, while the cedar glue gave strength of 191 and 157 psi and wood failure of 76 and 89% for open-assembly time of 20 and 40 minutes respectively. In comparison to the control glue, it can be concluded that the use of foliage powder or mulch for use as adhesive filler and extender is proven successful.

EXAMPLE 6

Particleboard type of adhesives

Particleboard adhesive requires less critical adhesion strength than adhesive normally used in the plywood and laminated beam industry since there is no wood failure specification for particleboard. An adhesive which can easily meet the particleboard bonding requirement may not develop adequate adhesion strength for plywood or laminated beam bond quality.

In this experiment, a sequence of adhesives was made by mixing different quantities of foliage powders, with phenol-formaldehyde resin. The phenolic resin and Douglas-fir foliage powder were mixed in the proportions of 0 to 80% foliage content based on solid weight of the adhesive-foliage mixture at 10% intervals. In the high foliage content range (higher than 50%), the viscosity of the adhesive becomes relatively high for the reason of water being absorbed into the foliage powder and additional water was added to the adhesive for viscosity adjustment.

To minimize the particle geometry influence on the adhesion strength, it was decided to make the samples as plywood. Each of the adhesive-foliage mixtures was spread on white spruce veneers at a spread of 50 pounds and 30 pounds per thousand square foot of double gluelines and made into 5-ply plywoods. The open assembly time was 5 minutes. The plywoods were pressed at 300° F for 10 minutes at 200 psi.

The test boards were cut into 1 × 1 in. specimens and the specimens were tested according to the torsion shear method of Shen and Carroll (Shen, K. C. and M. N. Carroll. Forest Prod. J. 19(8): 17–22. 1969). In a separate experiment, with exactly matched specimens, the factor between the torsion shear strength and standard internal bond strength was found to be 0.95 to 1.0. Therefore the torsion shear strength is directly used as indicator of the adhesion potential in particleboard.

The result of the torsion shear test results are shown in Table 8.

TABLE 8

| Foliage Concentration (%) | Torsion shear strength (lb./in.$^2$) | | |
|---|---|---|---|
| | 30 lb. spread* | 50 lb. spread* | Ave. |
| 0 (control) | 158 | 192 | 175 |
| 10 | 141 | 162 | 152 |
| 20 | 159 | 167 | 163 |
| 30 | 168 | 152 | 160 |
| 40 | 153 | 162 | 158 |
| 50 | 150 | 160 | 155 |
| 60 | 133 | 148 | 141 |
| 70 | 129 | 124 | 127 |
| 80 | 72 | 60 | 66 |

*poundage of adhesive spread. Each value is the average of 20 specimens.

These results indicate that even with the 80% level foliage content, the adhesive can develop adequate strength to bond the panel together for the torsion shear testing and produced satisfactory strength. These data suggest that the foliage itself possessed considerable adhesive capability. The use of the foliage in adhesives therefore can be extended to about the 80 to 95% range for producing products of suitable adhesion strength for specified end uses where the higher strengths are not required.

EXAMPLE 7

Larger scale tests in bonding plywood were carried out using a commerical phenolic resin adhesive extended with Douglas Fir foliage at the 2.2 and 3.7% level (based on glue weight). The bond tests were conducted as specified in CSA 0121 Douglas Fir Plywood and CSA 0151 Canadian Softwood Plywood, Bond Test. The plywood was all ½ inch (5 × 0.104), part all Fir and part mixed Fir and Spruce. The wood failures (%) shown were each the average of 5 panels.

Improvement in wood failure averages was obtained with foliage present. The foliage glue appeared to have better flowability hence improved transfer, penetration and improved wood failures. Mixed glue viscosities were very stable and no precipitation was noted. There is no notable difference compared to standard glue mixes in the application of foliage glue at the spreaders. The foliage glue-bonded test chips showed a much higher degree of wood pulled than those of the control. This was particularly noticeable over areas of "sloping grain" wherein there was less "fine fibre" and large amounts of wood pulled.

TABLE 9

| Veneer Species | Assembly Time | Vac-Pressure | | Boil-Dry-Boil | |
|---|---|---|---|---|---|
| | | WF | Str | WF | Str |
| Control | | | | | |
| All Fir | 12 min | 71.6% | 180 psi | 69.4% | 136 psi |
| Fir & Spruce | 12 min | 83.2% | 190 psi | 82.4% | 139 psi |
| All Fir | 25 min | 73.2% | 185 psi | 81.4% | 152 psi |
| Fir & Spruce | 25 min | 87.0% | 144 psi | 85.6% | 139 psi |
| 20 Panel Lot Average | | 78.8% | 175 psi | 79.9% | 142 psi |
| 2.2% Foliage | | | | | |
| All Fir | 12 min | 88.8% | 222 psi | 94.4% | 168 psi |
| Fir & Spruce | 12 min | 75.2% | 193 psi | 89.2% | 131 psi |
| All Fir | 25 min | 80.8% | 143 psi | 79.8% | 111 psi |
| Fir & Spruce | 25 min | 82.8% | 133 psi | 86.4% | 111 psi |
| 20 Panel Lot Average | | 81.9% | 173 psi | 87.5% | 130 psi |
| 3.7% Foliage | | | | | |
| All Fir | 12 min | 84.4% | 159 psi | 93.2% | 130 psi |
| Fir & Spruce | 12 min | 81.0% | 192 psi | 83.4% | 154 psi |
| All Fir | 25 min | 83.4% | 150 psi | 84.0% | 117 psi |
| Fir & Spruce | 25 min | 69.6% | 177 psi | 81.0% | 141 psi |
| 20 Panel Lot Average | | 79.6% | 170 psi | 85.4% | 136 psi |

EXAMPLE 8

Use of foliage as extender of particleboard powder phenolic resin

Commercial particleboard phenolic resin (Novolac) was used in this experiment. As the resin content in commercial particleboard is in the 3 to 5% range, the resin distribution becomes extremely important to the properties of the resulting boards. Addition of foliage powder to dry phenolic resin could lead to a more uniform resin distribution and better adhesion in the board, thus enhancing board strength and possibly reducing the quantity of resin required.

To study this, a 50:50 mixture of Douglas-fir foliage power (passed 60 mesh screen) and the powder resin was prepared. Particleboard made of Douglas-fir planer shavings (moisture content 9%) and the resin-foliage mixture at 2.5% (1.25% actual resin content) 5% (2.5% actual resin content) and 10% (5% actual resin content) based on the weight of the wood was prepared and pressed into boards at 350° F for 10 minutes. The board thickness was 3/8 in. and the density was 0.8. Similarly, the control boards made with phenolic powder resin alone, without the mixture of foliage powder, were also prepared at 1.25%, 2.5% and 5% resin content levels based on wood weight.

Test results for internal bond (IB) strength and modulus of rupture (MOR) in bending of particleboards with the two resin systems ae shown in the following Table 10. Each value is the average of 6 tests from 2 boards.

TABLE 10

| Phenolic Resin | Foliage Extended | | Resin Alone | |
|---|---|---|---|---|
| Content (%) | IB (psi) | MOR (psi) | IB (psi) | MOR (psi) |
| 1.25 | 18 | 1479 | 3 | 468 |
| 2.5 | 65 | 1806 | 21 | 1128 |
| 5.0 | 140 | 2560 | 83 | 2068 |

The above results indicate that foliage in admixture with powdered phenolic resin can enhance the strength properties of particleboard, probably through more uniform resin distribution in the boards and also possibly through adhesion properties of the hot pressed foliage material.

Using the same resin as in the above study, a 50/50 mixture of white spruce foliage and resin was prepared. Waferboards were made of aspen flakes (industrially cut and dried) and the resin/foliage mixture having resin/foliage contents of 2.2% (1.1% actual resin content), 2.8% (1.4% actual resin content), 3.4% (1.7% actual resin content) and 6% (3% actual resin content) based on the weight of wood. The boards were formed and pressed into ½-inch boards at 395° F (202° C) for 7.5 minutes. The board density was 0.65 ± 0.01. Control boards using the same resin were also prepared having resin contents of 1.1%, 1.4%, 1.7%, and 3%. Three boards for each resin content were made. Four specimens for bending strength tests were cut from each board. Two of the boards were tested dry and the other two were tested after 2 hours boiling in water.

The results of the tests are shown in the next table.

TABLE 10a

| Actual resin content (%) | Bending Strength Tests | | | |
|---|---|---|---|---|
| | Control | | Foliage add. | |
| | Dry | Boiled | Dry | Boiled |
| 1.1 | 749 psi | 112 psi | 1498 psi | 281 psi |
| 1.4 | 760 | 169 | 1996 | 373 |
| 1.7 | 1833 | 610 | 3233 | 1152 |
| 3.0 | 3459 | 1356 | 3563 | 1458 |

The experimental results using white spruce foliage as an adhesive extender again demonstrate its effectivenss in enhancing the bending strength of the board tested dry and after 2 hours boiling. These results apply also to hardboards.

EXAMPLE 9

Urea-formaldehyde glue

The feasibility of foliage powder as urea-formaldehyde (UF) glue extender was examined. A commercial plywood UF glue formulation and Douglas-fir foliage powder were used. The control glue, on the weight basis includes 44% of water, 28% of wheat flour, 22% of UF resin solid and 6% of miscellaneous ingredients. The weight of wheat flour in this glue formulation is 1.28 times greater than the UF resin solid used. In comparison to commercial phenol-formaldehyde (PF) glue which has 2.2% by weight of wheat flour and 10.3% of Model filler, the UF glue contains about 13 times more wheat flour or 2.2 times greater than the combined extender and filler for the PF glue.

In the following experiment, the same commercial UF glue formulation was used but 70% weight of the wheat flour was replaced by Douglas-fir foliage powder to give a UF glue with 20% foliage content. To have a better viscosity for glue application with roller spreader, a 4% weight of water was added to the glue.

Because the volume of the glue produced by same weight of foliage powder replacement for wheat flour was greater than wheat flour alone, the maximum glue spread of the foliage glue was about 65 pounds per thousand square foot of double glueline (lb/Mft²). This is smaller than the glue spread (70 to 90 lb/Mft²) of control glue as recommended by the adhesive manufacturer. Industrially dried ⅛ in. thick white spruce veneers were used for the plywood making. The 5-ply plywood was made at 240° F press temperature and under 150 psi pressure for 5½ mins. The results are shown below:

TABLE 11

| Glue | Glue Spread (lb/Mft²) | Open Assembly time (min) | Bond quality* | |
|---|---|---|---|---|
| | | | Strength (psi) | Wood Failure (%) |
| Control | 70 | 15 | 188 | 85 |
| Foliage Glue | 35 | 5 | 208 | 79 |
| | 50 | 15 | 217 | 82 |
| | 65 | 15 | 220 | 91 |

*by vacuum-pressure soak test method.

Each value of the bond quality test was the average from 2 panels tested and deriving from 10 specimens from each panel.

These results indicate the foliage powder can substitute for wheat flour in the glue formulation while obtain similar results as that for the control glue with complete wheat flour.

I claim:

1. An adhesive composition for bonding wood comprising
   (a) a wood adhesive, and
   (b) finely divided tree foliage as extender or as extender-plus-filler.

2. The adhesive composition of claim 1 wherein the foliage is derived from conifers or other evergreens.

3. The adhesive composition of claim 1 wherein the foliage is derived from deciduous trees.

4. The adhesive composition of claim 1 wherein the amount of foliage ranges from about 1 to 65% by weight of the composition solids, suitable for plywood bonding.

5. The adhesive composition of claim 1 wherein the amount of foliage ranges up to about 95% by weight of the composition solids, suitable as particleboard-type adhesive.

6. The adhesive composition of claim 1 wherein the adhesive resin is a phenol-aldehyde condensation product.

7. The adhesive composition of claim 1 wherein the adhesive resin is a phenol-formaldehyde novolac.

8. The adhesive composition of claim 1 wherein the adhesive resin is a urea-aldehyde condensation product.

9. The adhesive composition of claim 1 wherein the adhesive resin is polyvinyl acetate.

10. The adhesive composition of claim 1 wherein the foliage is a mixture derived from different tree species, the mixture being selected to give a desired viscosity to the composition.

11. The adhesive composition of claim 1 in uniformly blended powder form.

12. The adhesive composition of claim 1 containing water to give a suitable viscosity for spreading.

13. The adhesive composition of claim 1 in final cured form.

14. An artificial wood board product bonded with the adhesive of claim 13.

* * * * *